(12) United States Patent
Iyoki et al.

(10) Patent No.: US 7,973,942 B2
(45) Date of Patent: Jul. 5, 2011

(54) OPTICAL DISPLACEMENT DETECTION MECHANISM AND SURFACE INFORMATION MEASUREMENT DEVICE USING THE SAME

(75) Inventors: Masato Iyoki, Chiba (JP); Hiroyoshi Yamamoto, Chiba (JP); Kazutoshi Watanabe, Chiba (JP); Masatsugu Shigeno, Chiba (JP)

(73) Assignee: SII Nano Technology Inc. (JP)

( * ) Notice: Subject to any disclaimer, the term of this patent is extended or adjusted under 35 U.S.C. 154(b) by 418 days.

(21) Appl. No.: 11/841,445

(22) Filed: Aug. 20, 2007

(65) Prior Publication Data

US 2008/0049236 A1    Feb. 28, 2008

(30) Foreign Application Priority Data

Aug. 22, 2006 (JP) ................. 2006-225731

(51) Int. Cl.
| | |
|---|---|
| G01B 11/14 | (2006.01) |
| G01B 11/30 | (2006.01) |
| G01N 21/55 | (2006.01) |
| G01N 23/00 | (2006.01) |
| G01N 21/86 | (2006.01) |
| G21K 7/00 | (2006.01) |
| G01V 8/00 | (2006.01) |
| G01Q 20/02 | (2010.01) |

(52) U.S. Cl. ........ 356/614; 356/445; 356/600; 356/601; 356/616; 356/620; 250/306; 250/559.29; 850/6

(58) Field of Classification Search .................. None
See application file for complete search history.

(56) References Cited

U.S. PATENT DOCUMENTS 5,196,713 A * 3/1993 Marshall .................. 250/559.31
(Continued)

FOREIGN PATENT DOCUMENTS

JP    H10-104245    4/1998

OTHER PUBLICATIONS

Takeshi Fukuma et al., "Development of low noise cantilever deflection sensor for multienvironment frequency-modulation atomic force microscopy," Review of Scientific Instruments, 76, 053704 (2005).

*Primary Examiner* — Tarifur R Chowdhury
*Assistant Examiner* — Gordon J Stock, Jr.
(74) *Attorney, Agent, or Firm* — Brinks Hofer Gilson & Lione

(57) ABSTRACT

There is provided an optical displacement detection mechanism in which, even if a measurement object changes, a detection sensitivity and a ratio of a noise are adjustable without depending on optical characteristics such as reflectivity, or a shape and mechanical characteristics of a measurement object, an influence of a thermal deformation of the measurement object by an irradiated light to the measurement object can be made small, and a measurement accuracy can be ensured under optimum conditions. In an optical displacement detection mechanism comprising a light source irradiating a light to a cantilever becoming the measurement object, a light source drive circuit driving the light source, a photodetector receiving the light after irradiated to the cantilever from the light source to thereby detect an intensity of the light, and an amplifier amplifying a detection signal of the photodetector at a predetermined amplification rate, there is made such that, by providing a light intensity regulator and an amplification rate regulator, an irradiated light intensity to the cantilever and an amplification rate of the photodetector can be made variable.

14 Claims, 7 Drawing Sheets

U.S. PATENT DOCUMENTS

| | | | |
|---|---|---|---|
| 5,357,105 A * | 10/1994 | Harp et al. | 250/234 |
| 5,537,863 A * | 7/1996 | Fujiu et al. | 73/105 |
| 6,294,774 B1 * | 9/2001 | Ito et al. | 250/201.3 |
| 6,459,798 B1 * | 10/2002 | Paritsky et al. | 381/172 |
| 6,884,981 B2 * | 4/2005 | Proksch et al. | 250/201.3 |
| 6,941,798 B2 * | 9/2005 | Yamaoka et al. | 73/105 |
| 7,116,430 B2 * | 10/2006 | Degertekin et al. | 356/505 |
| 7,220,962 B2 * | 5/2007 | Kawakatsu | 250/306 |
| 2002/0000511 A1 * | 1/2002 | Schaffer et al. | 250/216 |
| 2005/0242283 A1 * | 11/2005 | Hasegawa et al. | 250/310 |
| 2006/0191329 A1 * | 8/2006 | Adderton et al. | 73/105 |
| 2008/0049223 A1 * | 2/2008 | Iyoki et al. | 356/369 |
| 2008/0223120 A1 * | 9/2008 | Girard et al. | 73/105 |

* cited by examiner

PRIOR ART

PRIOR ART

US 7,973,942 B2

OPTICAL DISPLACEMENT DETECTION MECHANISM AND SURFACE INFORMATION MEASUREMENT DEVICE USING THE SAME

This application claims priority under 35 U.S.C. §119 to Japanese Patent Application No. JP2006-225731 filed Aug. 22, 2006, the entire content of which is hereby incorporated by reference.

BACKGROUND OF THE INVENTION

1. Field of the Invention

The present invention relates to an optical displacement detection mechanism in which a light from a light source is irradiated to a measurement object to thereby detect an intensity of the light after the irradiation by a photodetector, and especially, to a surface information measurement device, such as scanning probe microscope, surface roughness meter, hardness meter or electrochemical microscope, which measures, by using this optical displacement detection mechanism, a shape information and various physical information (e.g., dielectric constant, magnetized state, transmissivity, viscoelasticity, friction coefficient, and the like) of a sample surface.

2. Description of the Related Art

A scanning probe microscope (SPM: Scanning Probe Microscope) is known as a device for performing observations on irregularities information of the sample surface, a-physical property information and the like by measuring in a micro region of a sample of metal, semiconductor, ceramic, resin, high polymer, biomaterial, insulator and the like.

In the scanning probe microscope, one possessing a sample holder on which the sample is mounted, and a cantilever which has a probe in its tip and is approached to a surface of the sample, becomes well known. And, there is made such that a surface shape and the various physical property information are measured by performing a distance control between the sample and the probe by relatively scanning the sample and the probe in a sample face (XY plane) and operating the sample or the probe in a direction (Z direction) intersecting perpendicularly to the sample surface while measuring during this scanning a displacement quantity of the cantilever by a displacement detection mechanism.

FIG. 6 shows a schematic, view of the structure of the scanning probe microscope in which a conventional, typical optical displacement detection mechanism is used (e.g., refer to JP-A-10-104245 Gazette).

A scanning probe microscope 201 of FIG. 6 has a sample stage 212 where a sample 211 is mounted to face a tip and, by a three-axis minute movement mechanism (scanner) 213 constituted by a cylindrical piezoelectric element whose terminal is fixed onto a base 215, the sample 211 is minutely moved in the direction (Z direction) perpendicular to the sample face while being scanned in the sample face (XY plane).

Further, a cantilever 207 having in its tip a probe 209 is retained to a support post 203 fixed to a base 215, through an arm 205 whose rigidity is high. It is a constitution in which, in a tip part lower face of the cantilever 207, the probe 209 is formed so as to protrude downward, and a tip of the probe 209 is approached to the sample 211 surface by a rough movement mechanism (not shown in the drawing) capable of operating in the Z direction.

Above the cantilever 207, there is provided an optical displacement detection mechanism constituted by a semiconductor laser (LD) 221 and a photodetector 235 whose material is made from a semiconductor, and generally called an optical lever system.

Here, an operation principle of this optical displacement detection mechanism of the optical lever system is detailedly explained. (For example, refer to Non-Patent Document 1: Takeshi Fukuma et al., Development of low noise cantilever deflection sensor for multienvironment frequency-modulation atomic force microscopy, REVIEW OF SCIENTIFIC INSTRUMENTS, 76, 053704 (2005))

FIG. 7A is a schematic constitutional view of an optical displacement detection mechanism 200, and FIG. 7B is an electric circuit view connected to the photodetector 235 whose material is made from the semiconductor. In this optical displacement detection mechanism 200, a laser light (incident light 231) from the light source 221 disposed above the cantilever 207 and comprising a semiconductor laser is condensed and irradiated to a back face of the cantilever 207 by a lens 240. This incident light 231 reflects in the back face of the cantilever 207, and a reflected light 233 impinges against the photodetector 235 obliquely disposed above the cantilever 207 and constituted by the semiconductor. This photodetector 235 is a constitution in which its light reception face is bisected upward and downward, and can detect an incident position of the reflected light 233.

By measuring an intensity difference between the lights entering to a region A of an upside light reception face and a region B of a downside light reception face of the photodetector 235 as shown in FIG. 7B, it becomes possible to measure a deflection quantity of the cantilever 207. If the lights enter to the photodetector 235, light signals are converted into electric signals, and electric currents iA and iB generate from the respective light reception faces A and B. These electric currents are converted into voltage signals $V_A$ an $V_B$ by an electric current/voltage conversion circuit 242 constituted by an operational amplifier 245 and a feedback resistance $R_{1V}$, which are connected to the respective light reception faces. At this time, if a feedback resistance value of the electric current/voltage conversion circuit 242 is $R_{1V}$, there are relations of $V_A=R_{1V} \times i_A$, and $V_B=R_{1V} \times i_B$. Like this, the electric current/voltage conversion circuit 242 acts as an initial stage amplifier converting an electric current signal into the voltage signal at an amplification rate $R_{1V}$.

These voltage signals $V_A$ and $V_B$ are sent to a differential amplification circuit 243 constituted by an operational amplifier 246 and resistances R2 and R3, and detects a difference signal $V_{A-B}$ of the voltage. Here, like FIG. 7A and FIG. 7B, in the case where the differential amplification circuit is constituted by the operational amplifier and the resistance values R2 and R3, a relation of $V_{A-B}=(R3/R2) \times (V_A-V_B)$ is effected, and the differential amplification circuit 243 acts as an amplifier amplifying the voltage signal at an amplification rate R3/R2, thereby outputting the voltage signal $V_{A-B}$.

Here, in FIG. 6 and FIG. 7A and FIG. 7B, in a case where the probe 209 and the sample 211 approach relative to each other, an interatomic force acts first and, if they are additionally approached, a contact force acts, so that a deflection occurs in the cantilever 207. If the cantilever 207 deflects, a spot 241 on the light reception face of the photodetector 235 moves upward and downward. Here, by detecting the voltage signal $V_{A-B}$ of the difference between the upper and lower light reception faces by the differential amplification circuit 243, it becomes possible to measure the deflection quantity of the cantilever 207. Incidentally, in order to cut a frequency component other than a band used in the measurement to thereby suppress a noise, a band-pass filter 244 is normally provided in a back side of the differential amplification circuit 243, and a signal passing through this band-pass filter 244 is sent to a Z feedback circuit 251.

Since the deflection quantity of the cantilever 207 depends on a distance between surfaces of the probe 209 and the sample 211, an irregularities image of the sample surface is obtained by detecting the defection quantity of the cantilever 207 based on the output voltage $V_{A-B}$ of the photodetector 235, inputting it to the Z feedback circuit 251, controlling the distance between surfaces of the probe 209 and the sample 211 by the Z minute movement mechanism 213 such that the deflection quantity becomes constant, i.e., the output voltage $V_{A-B}$ becomes constant, and scanning the sample by the XY scanner 213. These controls are performed by a control section 257, and the three-axis minute movement mechanism 213 is driven by an XYZ scanner driver 253. The obtained irregularities image is displayed to a display section 255.

In this optical displacement detection mechanism, a resolving power of a measurement data in a height direction is determined by magnitudes of a detection sensitivity (output voltage quantity per unit length) of the displacement detection mechanism and a noise component mixed in the signal of the optical displacement detection mechanism.

Here, as factors of the noise in the optical displacement detection mechanism, several reasons are considered (refer to Non-Patent Document 1: Takeshi Fukuma et al., Development of low noise cantilever deflection sensor for multienvironment frequency-modulation atomic force microscopy, REVIEW OF SCIENTIFIC INSTRUMENTS, 76, 053704 (2005)).

(1) A shot noise of the photodetector
(2) A Johnson noise (thermal noise) of the photodetector
(3) A quantum noise of the light source
(4) A returned light noise and a mode hop noise of the light source
(5) A thermal fluctuation of the cantilever
(6) An interference noise of the light Among these, one in which a degree of dependence is highest in a frequency band used in the normal scanning probe microscope is the shot noise of the photodetector of (1), and a ratio of the shot noise to the detection sensitivity becomes small in inverse proportion to a square root of a light quantity P in the light reception face.

Further, if there becomes a region in which the frequency at the measurement time is high, it follows such that also the degree of dependence of the Johnson noise of (2) increases, and a ratio of the Johnson noise to the detection sensitivity becomes small in inverse proportion to the light quantity P in the light reception face.

Here, if there are supposed that the light quantity P in the light reception face is an output PO of the light source, and a transmission efficiency of the light on an optical path from the light source to the photodetector via a measurement object is $\alpha$, there is expressed as $P=\alpha PO$ Like this, as to the shot noise and the Johnson noise, if the intensity P on the light reception face of the photodetector increases, a quantity of the noise in regard to the detection sensitivity decreases and, as a result, a resolving power of the measurement data rises. That is, enlarging the output PO of the light source or rising the transmission efficiency on the optical path is effective for lowering the ratio of the noise to the detection sensitivity.

On the other hand, if there is considered about the noise in a light source side of a semiconductor laser that is the light source most generally used in the conventional optical displacement detection mechanism, as to the semiconductor laser, in its low power region, a ratio of a natural emission light in an element inside becomes many, and a noise called the quantum noise of (3) generates. As a power is raised, a ratio of an induced emission light becomes predominant, and a ratio of the quantum noise decreases. However, as to the semiconductor laser, the quantum noise exclusively decreases as the output is enlarged and, in a case where there is driven by a high output, there generate, as shown in (4), the returned light noise which returns to the semiconductor laser by reflecting in the cantilever and the sample or the optical element etc. disposed in the optical path, and the mode hop noise generating at a fluctuation time of a temperature or the light output. Therefore, an optimum value exists in the output in a light source side, and a drive is performed below 2 mW in the prior art. Like this, in order to lower a quantum noise level of the photodetector, although it is necessary to enlarge the output in the light source side, there is a limit in suppressing the generations of the returned light noise and the mode hop noise in the light source side.

Further, in order to reduce the mode hop noise and the returned light noise, it is effective to lower a coherency of the light source. In other words, in a spectrum of an intensity in regard to a wavelength of the light source, it is desirable to use a light source in which a spectrum width of a portion, in which the intensity becomes maximum, is wide and, with this purpose, a high frequency modulation is applied to the semiconductor laser. Further, in order to prevent the returned light by the measurement object, a member on the optical path, and the like, there is performed such a contrivance as to use an optical system in which the reflected light does not return to the semiconductor laser by changing polarized light states of the incident light and the reflected light. However, even if such a contrivance is performed, since the mode hop noise and the returned light noise cannot be eliminated completely, the drive is performed with a light intensity in the light source side being made below 2 mW.

Further, since the semiconductor laser is the light source in which the coherency is high and which is excellent in an interference possibility, in the scanning probe microscope for instance, the reflected light in the cantilever interferes with a light reflecting from the sample while overflowing the cantilever, so that there is a case where the interference noise of (6) occurs in the irregularities image and the data at the physical property measurement time in regard to the distance between the probe and the sample.

Like the above, although the optimization of the output of the light source is performed such that a ratio of the noise to the detection sensitivity of the optical displacement detection mechanism becomes small by optimizing the output of the light source, in the conventional optical displacement detection mechanism, since the light intensity in the light source side and an amplification rate of the amplifier in the photodetector side are fixed, there are such issues as mentioned below.

(1) By optical characteristics, such as reflectivity, of the measurement object and a shape of the measurement object, since the light intensity in the light reception face of the photodetector changes, the detection sensitivity and the ratio of the noise differ by the measurement object.

(2) There is a case where, by an irradiated light to the measurement object from the light source, the measurement object is heated, and thus the measurement object deforms.

(3) In the optical displacement detection mechanism of the optical lever system, or the like, the detection sensitivity changes by a shape such as length and mechanical characteristics such as spring constant of the measurement object.

Especially, in the scanning probe microscope, there is performed such a contrivance as to earn the reflectivity by coating aluminum, gold or the like to the cantilever made of silicon or silicon nitride, which is the measurement object, in order to prevent a lowering of the detection sensitivity and an increase in the noise. Further, in a case where electrical characteristics of the sample are measured by the scanning probe microscope, the cantilever is caused to have an electrical conductivity by coating an electric conductor such as gold and rhodium to the cantilever. Further, depending on the sample to be measured, there is selected the cantilever in which the mechanical characteristics, such as spring constant and resonance frequency, and the shape differ.

Accordingly, in the scanning probe microscope, the reflectivity greatly differs depending on the cantilever, and the detection sensitivity and the ratio of the noise differ depending on the measurement object.

Further, by a difference in linear expansion coefficient between a material of a film coated to the cantilever and a base material of the cantilever, a temperature of the cantilever rises by the irradiated light from the light source, so that the cantilever generates a deflection deformation. In a case where there is considered the ratio of the noise to the detection sensitivity, since the light is irradiated to the cantilever at a high intensity, an influence of the thermal deformation is large in the cantilever whose spring constant is small.

Further, depending on a selected different shape of the cantilever, the detection sensitivity changes since a lever ratio of the optical lever changes.

By the issues like the above, in the conventional optical displacement detection mechanism, a measurement accuracy deteriorates.

SUMMARY OF THE INVENTION

Accordingly, an object of the present invention is to provide such an optical displacement detection mechanism that, even if the measurement object changes, the detection sensitivity and the ratio of the noise are adjustable without depending on the reflectivity, the shape and the mechanical characteristics of the measurement object, the influence of the thermal deformation of the measurement object by the irradiated light to the measurement object can be made small, and the measurement accuracy can be ensured under the optimum conditions, and a surface information measurement device using the same.

In order to solve the above problems, in the present invention, the optical displacement detection mechanism and the surface information measurement device using the same are constituted by the following means.

It is an optical displacement detection mechanism comprising a light source irradiating a light to a measurement object, a light source drive circuit driving the light source, a photodetector receiving the light after irradiated to the measurement object from the light source to thereby detect an intensity of the light, and an amplifier amplifying a detection signal of the photodetector at a predetermined amplification rate, wherein there is provided a light intensity variable means making the intensity of the light irradiated to the measurement object from the light source variable.

The light intensity variable means is the light source drive circuit connected to the light source, and there is made such that the light intensity of the light source is adjusted by the light source drive circuit.

Further, the light intensity variable means is made an optical filter adjusting the intensity of the light, which is possessed on an optical path between the light source and the measurement object.

There is made such that the light from the light source is irradiated to the measurement object, a reflected light from the measurement object is received by the photodetector, the intensity of the light irradiated to the measurement object is made variable in compliance with a reflectivity of the measurement object, and an intensity of the reflected light after being reflected by the measurement object becomes a predetermined value.

Further, in the present invention, in an optical displacement detection mechanism comprising a light source irradiating a light to a measurement object, a light source drive circuit driving the light source, a photodetector receiving the light after irradiated to the measurement object from the light source to thereby detect an intensity of the light, and an amplifier amplifying a detection signal of the photodetector at a predetermined amplification rate, there is provided an amplification rate variable means making a setting of an amplification rate in the amplifier variable.

By using the optical displacement detection mechanism constituted like this, there is made such that a detection sensitivity of the optical displacement detection mechanism becomes a predetermined value by irradiating the light from the light source to the measurement object, receiving the reflected light from the measurement object by the photodetector, and making the amplification rate in the amplifier variable in compliance with a reflectivity of the measurement object.

By constituting like the above, it is possible to adjust the intensity in the light reception face of the photodetector without depending on the shape and the reflectivity of the measurement object and, as a result, it becomes possible to arbitrarily set the detection sensitivity and the ratio of the noise to optimum states.

Further, in the present invention, there is made such that in a case where, when the light from the light source is irradiated to the measurement object, the measurement object is heated by the irradiated light and thus the measurement object deforms, the intensity of the light irradiated to the measurement object is made variable such that a deformation quantity fits into a predetermined value.

By constituting like this, it is possible to perform an adjustment of the light intensity such that the influence of the thermal deformation of the measurement object is not exerted on the measurement accuracy.

Further, the optical displacement detection mechanism of the present invention is applied to a scanning probe microscope having the optical displacement detection mechanism of the present invention, wherein the measurement object is made a cantilever having a probe in its tip or a probe of an arbitrary shape, and there are possessed a sample holder holding a sample, a holder holding the cantilever or the probe, a movement means comprising a minute movement mechanism of at least one axis, which relatively moves the cantilever or the probe and the sample holder at least in a Z direction perpendicular to a surface of the sample, and a control means controlling the movement means on the basis of a detection result by the optical displacement detection mechanism, thereby gathering an observation data of the sample.

In a case where the optical displacement detection mechanism of the present invention is applied to the scanning probe microscope, there is made such that the light source is made a semiconductor laser or a super luminescence diode or a light emitting diode, and a light intensity of the light source is made variable by an electric current value of the light source drive circuit. Further, there is made such that a light reception face of the photodetector is made a photodiode comprising a semiconductor material divided into four or bisected, each light reception face of the photodetector is connected to an electric current/voltage conversion circuit and additionally connected to a differential amplification circuit, an amplifier comprises the electric current/voltage conversion circuit and the differential amplification circuit, and a setting of an amplification rate is made variable by the electric current/voltage conversion circuit or/and the differential amplification circuit.

Further, there is made such that by applying the optical displacement detection mechanism of the present invention to a surface information measurement device measuring a surface information of a sample by performing a detection of a position information of a probe, a measurement of the position information of the probe is performed.

Like the above, by applying the present invention to the scanning probe microscope or the surface information measurement device, since it is possible to prevent deteriorations of the detection sensitivity and the noise or the thermal deformation, which depend on the influences of the optical characteristics such as reflectivity, the shape and the mechanical characteristics of the cantilever and the probe, which are used in the scanning probe microscope or the surface information measurement device and thus the detection can be performed at the light intensity and the amplification rate, which are optimum, it becomes possible to perform the measurement in the scanning probe microscope or the surface information measurement device under the optimum conditions.

Like the above, in the optical displacement detection mechanism of the present invention and the surface information measurement device using the same, by providing the light intensity variable means making the intensity of the light irradiated to the measurement object variable, or providing the amplification rate variable means in the amplifier provided in the photodetector, the detection sensitivity and the ratio of the noise can be adjusted even if the measurement object changes without depending on the optical characteristics such as reflectivity, or the shape and the mechanical characteristics, such as spring constant, of the measurement object, and the influence of the thermal deformation of the measurement object by the irradiated light to the measurement object can be made small, so that it is possible to ensure the measurement accuracy under the optimum conditions.

Especially, by applying the optical displacement detection mechanism of the present invention to the scanning probe microscope or the surface information measurement device, it becomes possible to perform the measurement in the scanning probe microscope or the surface information measurement device under the optimum conditions, and the measurement at a high accuracy becomes possible.

DETAILED DESCRIPTION OF THE PREFERRED EMBODIMENTS

Figure 1:
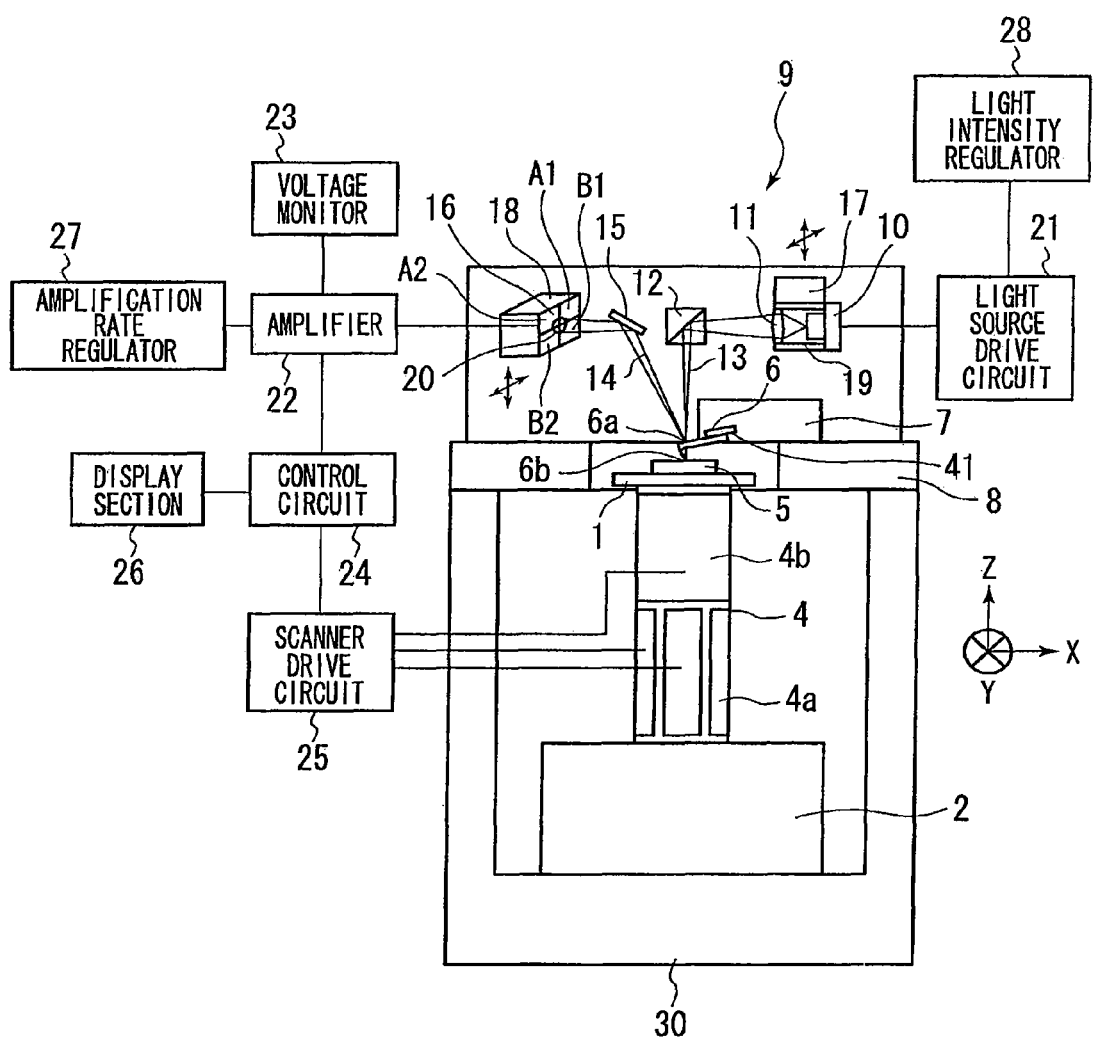
FIG. 1 is a schematic view showing a first embodiment of an optical displacement detection mechanism for a scanning probe microscope, which is concerned with the present invention.

Hereunder, about a case where an optical displacement detection mechanism of the present invention is applied to a scanning probe microscope, there is explained by referring to the drawings.

Embodiment 1

Figure 2:
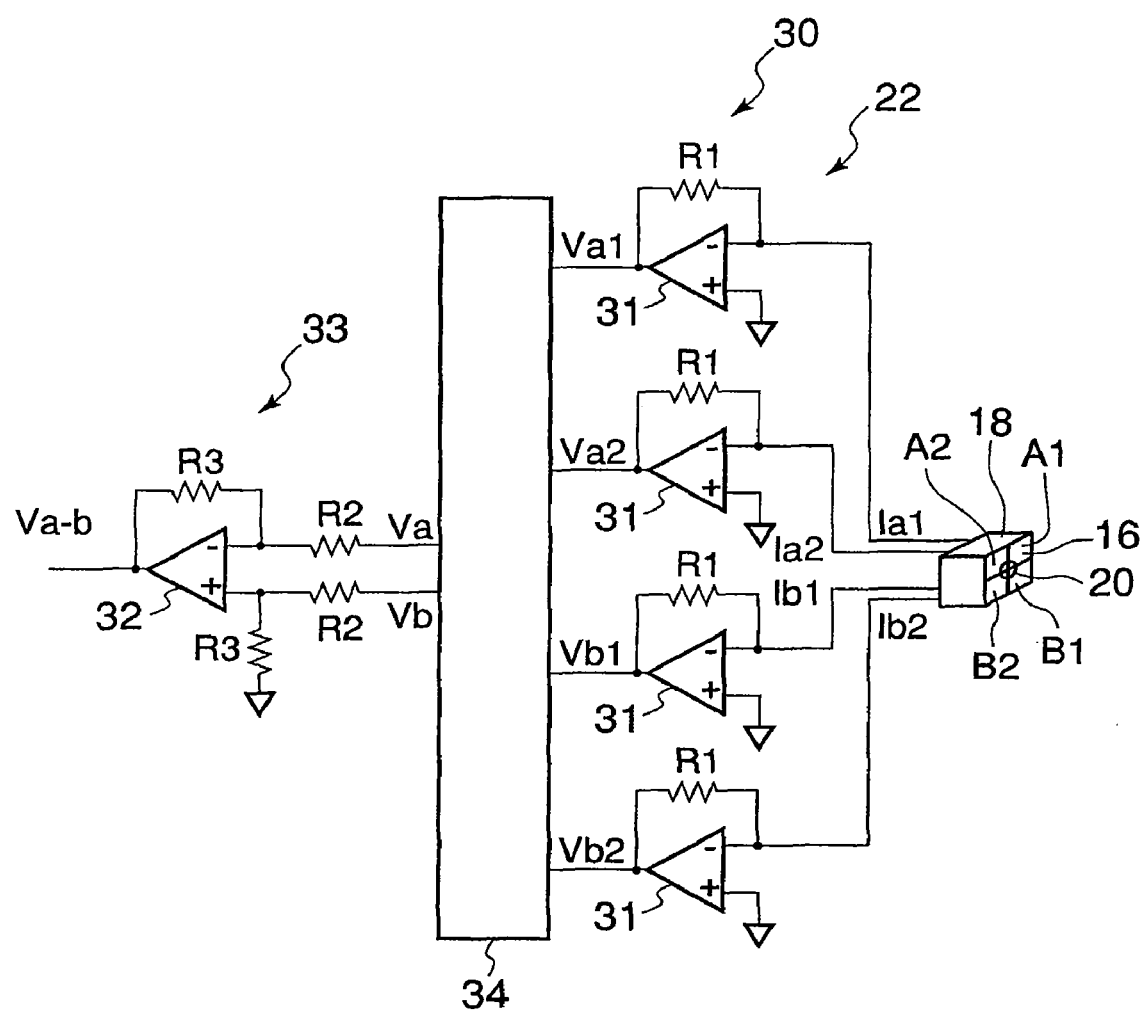
FIG. 2 is a circuit diagram of an amplifier depicted in FIG. 1.

FIG. 1 and FIG. 2 show schematic views of the optical displacement detection mechanism of a first embodiment concerned with the present invention. FIG. 1 is the schematic view in the case where the optical displacement detection mechanism is applied to the scanning probe microscope. Incidentally, although FIG. 1 shows a front view, a portion of a photodetector, is shown in a perspective view. Further, FIG. 2 is the schematic view of a circuit diagram of an amplifier 22 in FIG. 1.

In the present embodiment, it has a three-axis minute movement mechanism 4 comprising a cylindrical piezoelectric element, to whose tip there is fixed a sample holder 1 and whose terminal is fixed onto a rough movement mechanism 2. The three-axis minute movement mechanism 4 has an XY scanner part 4a scanning a sample 5 placed on the sample holder 1 in a sample face (XY plane) direction, and a Z minute movement mechanism 4b minutely moving in a direction (Z direction) perpendicular to the sample face.

Above the sample 5, a cantilever 6 having a sharpened probe 6b in a tip of a cantilever part 6a is fixed to a base 8 through a cantilever holder 7. Above the cantilever 6, there is disposed an optical displacement detection mechanism 9.

Here, an operation principle of a scanning probe microscope in the present embodiment is explained. The present embodiment is an atomic force microscope that is one kind of the scanning probe microscope, and it is used for performing a measurement of an irregularities image of the sample face. In the present embodiment, there becomes a constitution in which a system generally called a contact system atomic force microscope and an atomic force microscope by a vibration system can be jointly used.

In a case of the contact system, if the sample 5 is approached to the probe 6b by the rough movement mechanism 2, the interatomic force acts between the probe 6b and the sample 5, and thus the probe 6b undergoes an attraction force. If they are additionally approached, it follows that the probe 6b becomes so as to undergo a repulsion force, and finally the probe 6b contacts with the sample 5. At this time, in compliance with the force that the probe 6b undergoes, a deflection occurs in the cantilever 6. The force that the probe 6b undergoes, i.e., a deflection quantity of the cantilever 6, depends on a distance between surfaces of the probe 6b and the sample 5.

Accordingly, it is possible to obtain the irregularities shape of the surface of the sample 5 by raster-scanning the sample 5 by the XY scanner part 4a while changing the distance between the probe 6b and the sample 5 by the Z minute movement mechanism 4b such that the deflection quantity of the cantilever 6 becomes constant.

Further, in a case of the vibration system, the cantilever 6 is vibrated in the vicinity of a resonance frequency by a vibrator 41 comprising a piezoelectric element. If the probe 6b is approached to the sample 5 while measuring an amplitude and a phase of the cantilever 6 by the optical displacement detection mechanism 9, the interatomic force and an intermittent contact quantity act, and thus the amplitude and the phase change. Since a quantity of this change depends on the distance between the probe 6b and the sample 5, by controlling the distance between the probe 6b and the sample 5, it becomes possible to keep the distance between the probe 6b and the sample 5 constant.

Next, there are mentioned about a constitution and an operation principle of the optical displacement detection mechanism 9 of the present embodiment.

This optical displacement detection mechanism 9 is one generally called the optical lever system. A semiconductor laser of 670 nm in wavelength and 5 mW in maximum output is used in a light source 10, a laser light emitted from the light source 10 is condensed by a condensing lens 11, and it is irradiated from just above (Z direction) to a back face of the cantilever 6 that is a measurement object by bending an optical path of an incident light 13 by a beam splitter 12. A light source unit 19 includes the light source 10 and the condensing lens 11. A light source positioning mechanism 17 positions the light source unit 19 such that the laser light from the light source 10 irradiates the back surface of the cantilever 6, as shown in FIG. 1. An intensity of the light of the light source 10 is set by a light source drive circuit 21.

The cantilever 6 is disposed while being slanted in regard to the XY plane, and a reflected light 14 is reflected in a direction different from an optical axis of the incident light 13. The reflected light 14 is bent by a mirror 15 and enters onto a photodetector 16. A light detector positioning mechanism 18 positions the photodetector 16 such that the laser light irradiated from the light source 10 and reflected at the back surface of the cantilever reaches a reference position of the photodetector 16.

There is constituted such that the optical path of the light once image-forms in the back face of the cantilever 6 and forms a spot 20 having a limited size on a light reception face of the photodetector 16. There is made a constitution in which the photodetector 16 is a photodiode manufactured with a semiconductor being made a material, and the light reception face is divided into four (A1, A2, B1, B2).

If the light enters to the photodetector 16, an electric current signal generates from the semiconductor constituting the photodetector 16, and it is converted into voltage signals at predetermined amplification rates in each of the four light reception faces by the amplifier 22 possessing an electric current/voltage conversion circuit, which is provided in a rear end of the photodetector 16. An output at this time is displayed in a voltage monitor 23.

Here, in a case where the cantilever 6 deflects in the Z direction, the spot 20 on the photodetector 16 operates upward and downward on the light reception faces.

Accordingly, it becomes possible to measure the deflection quantity of the cantilever 6 by measuring an intensity difference A−B of the light entering to, among the light reception faces (A1, A2, B1, B2) divided into four, a region A (A1+A2) of the upside two light reception faces and a region B (B1+B2) of the downside two light reception faces.

Here, by FIG. 2, a circuit constitution of the amplifier 22 is explained. In the optical displacement detection mechanism 9 of the present embodiment, by measuring a difference in intensity between the lights entering to the region A of the upside light reception faces of the photodetector 16 and the region B of the downside light reception faces by using photodetector 16, it becomes possible to measure the deflection quantity of the cantilever 6. Here, there is supposed that an intensity of the light entering to each of the light reception faces is Pa1, Pa2, Pb1 or Pb2. If the light of the intensity of Pa1, Pa2, Pb1 or Pb2 enters to each of the light reception faces, a light signal is converted into an electric signal by the photodetector 16, and an electric current Ia1, Ia2, Ib1 or Ib2 generates from each of the light reception faces A1, A2, B1 and B2. A light reception sensitivity of the photodetector in the present embodiment is 0.65 A/W. This electric current is converted into a voltage signal Va1, Va2, Vb1 or Vb2 by an electric current/voltage conversion circuit 30 constituted by an operational amplifier 31 and a resistance R1, which are connected to each of the light reception faces. At this time, if it is supposed that a feedback resistance value of the electric current/voltage conversion circuit 30 is R1, there are relations of Va1=R1×Ia1, Va2=R1×Ia2, Vb1=R1×Ib1 and Vb2=R1×Ib2. Like this, in the electric current/voltage conversion circuit 30 of an initial stage, the amplification is performed at the amplification rate R1, and the electric current signal is converted into the voltage signal. These voltage signals are inputted to an adding circuit 34, and there are outputted a sum Va=Va1+Va2 of light quantities of the upside two light reception faces, and a sum Vb=Vb1+Vb2 of light quantities of the downside two light reception faces. These signals are sent to a differential amplification circuit 33 constituted by an operational amplifier 32 and resistances R2 and R3, and a difference signal Va−b of the voltages is detected. Here, like the drawing, in the case where the differential amplification circuit is constituted by the operational amplifier and the resistances R2 and R3, there is effected a relation of Va−b=(R3/R2)×(Va−Vb), the amplification is performed at an amplification rate R3/R2 by the differential amplifier, and the Va−b is outputted. Like this, the electric current/voltage conversion circuit 30 and the differential amplification circuit 33 act as an amplifier. By detecting this Va−b, it is possible to measure the deflection quantity of the cantilever 6.

By sending this voltage signal Va−b of A−B to a control circuit 24, comparing it with an operation point previously set, and operating the Z minute movement mechanism 4b from a scanner drive circuit 25 by a signal in compliance with its difference, a control is applied so as to keep the distance between the sample 5 and probe 6b constant. Additionally, by the scanner drive circuit 25, the XY scanner part 4a is operated, thereby raster-scanning the sample 5.

At this time, by displaying the voltage signal applied to the three-axis minute movement mechanism 4 in a display section 26, there is obtained the irregularities image of the surface of the sample 5.

In the present embodiment, there is made such that an output of the light source can be made variable by providing a light intensity regulator 28 in the light source drive circuit 21 to thereby make an electric current value to the semiconductor laser used in the light source 10 variable.

Further, an amplification rate regulator 27 is provided in the amplifier 22. There is made such that, by this amplification rate regulator 27, a resistance value R3 of the differential amplification circuit 33 is made variable to thereby make the amplification rate variable.

Here, there is made such that, by the light intensity regulator 28 and the amplification rate regulator 27, an optimization of conditions is performed in compliance with the cantilever that is the measurement object.

First, in a case where an observation of a silicon wafer surface or the like is performed by the atomic force microscope of the vibration system, there is used the cantilever whose material is made from silicon, in which the aluminum is coated to the back face of the cantilever 6 in order to raise the reflectivity, which is 125 μm in length, 30 μm in width and 4 μm in thickness, and whose spring constant is about 40 N/m.

In this case, since the spring constant is comparatively hard and it is the vibration system, in a case where the laser is irradiated, an influence in which the cantilever 6 is heated and thus the thermal deformation occurs does not exert a large influence on the measurement accuracy. Accordingly, there is made so as to raise the measurement accuracy by raising a light intensity of the light source 10 by using the light intensity regulator 28 in a range, in which the mode hop noise and the returned light noise don't generate, in order to lower the ratio of the noise to the detection sensitivity, and irradiating a strong light to the cantilever 6 to thereby increase an incident light quantity to the photodetector 16. In the present embodiment, the output of the light source 10 is made 1.5 mW, and the feedback resistance value R1 of the electric current/voltage conversion circuit 30 is set to 100 kΩ. Further, the resistance values of the differential amplification circuit 33 are set to R2=10 kΩ and R3=20 kΩ. That is, the amplification rates of the amplifiers are set to 100000 times in the electric current/voltage conversion circuit 30 of the initial stage, and two times in the differential amplification circuit 33 of the rear end.

Next, the measurement was performed by the atomic force microscope of the vibration system by using the cantilever 6 which is the same shape and to which no coating is applied for the purpose of reducing a manufacturing cost or preventing the resolving power from decreasing by the fact that the coating film adheres to the probe 6b in the tip. In this case, since the reflecting film by aluminum is not coated, the reflectivity of the cantilever 6 that is the measurement object lowers and thus the intensity of the light entering to the light reception face of the photodetector 16 decreases, thereby causing a decrease in the detection sensitivity and an increase in the noise. Therefor, in the present embodiment, an incident light quantity in the light reception face of the photodetector 16 is adjusted similarly to the case where the aluminum is coated to the cantilever 6 by increasing a value of the electric current driving the light source 10 by the light intensity regulator 28 by using the semiconductor laser as the light source 10, and supplementing a quantity corresponding to a reduction in the reflectivity by an increase in the incident light quantity to the cantilever 6. By this, it is possible to ensure the detection sensitivity and the ratio of the noise, which are equivalent to the case where the coating exists.

Next, there is used the cantilever whose material is made from silicon, in which the aluminum is coated only to the back face of the cantilever 6 in order to raise the reflectivity, which is 225 μm in length, 30 μm in width and 5 μm in thickness, and whose spring constant is about 13 N/m. Also in this case, since the spring constant is comparatively hard and it is the vibration system, in the case where the laser is irradiated, the influence in which the cantilever 6 is heated and thus the thermal deformation occurs does not exert the large influence on the measurement accuracy. Accordingly, there is made so as to raise the measurement accuracy by raising the light intensity of the light source 10 by using the light intensity regulator 28 in the range, in which the mode hop noise and the returned light noise don't generate, in order to decrease the ratio of the noise to the detection sensitivity, and irradiating the strong light to the cantilever 6.

However, in a case of the displacement detection mechanism of the optical lever system, the detection sensitivity changes by a length of the cantilever 6 and a lever ratio determined by a distance from an irradiation position of the light in the cantilever 6 to the photodetector 16, and the detection sensitivity is in inverse proportion to the length of the cantilever. Accordingly, in a case compared with the cantilever whose spring constant is 40 N/m in the above one example, since the length of the cantilever 6 is long by 1.8 times, the detection sensitivity lowers to 0.56 times in comparison with the case of the cantilever of 40 N/m. Thereupon, in order to raise the detection sensitivity, although the output of the light source 10 may be raised, since the generations of the mode hop noise and the returned light noise are made an issue because the semiconductor laser is used as the light source 10, in the present embodiment, a quantity corresponding to a decrease in the detection sensitivity is supplemented by adjusting an amplification rate of the amplifier, which is provided in the photodetector, by the amplification rate regulator 27.

Incidentally, in a case where if the influence of the thermal deformation appears, by applying a coat of the same material and the same film thickness to both faces of the cantilever 6, the thermal deformation scarcely occurs because the linear expansion coefficients of both faces become equal.

Next, there is mentioned about a case where the measurement is performed by the atomic force microscope of the contact system. In a case performing a contact mode, in order to reduce an influence of abrasion in a probe tip, there is used the cantilever whose spring constant is small. In the present embodiment, there is used the cantilever which is made of silicon nitride, which is 200 μm in length and 0.4 μm in thickness, to whose one face there is coated gold with chromium being made a substrate, and whose spring constant is about 0.02 N/m. In this cantilever 6, since the spring constant is small, the temperature of the cantilever 6 rises by the light irradiation, and a warp occurs in the cantilever 6 by a difference between the linear expansion coefficient of a metal coat portion and the linear expansion coefficient of a silicon nitride base material portion, so that the measurement accuracy deteriorates. Thereupon, in the present embodiment, a heat generation is made small by lowering, by the light intensity regulator 28, the value of the electric current driving the semiconductor laser 10 to 0.5 mW that is a magnitude of ⅓ in comparison with a case where the aluminum coat of 40 N/m is applied by the vibration system. Further, in order to supplement the decrease in the detection sensitivity by the reduction in the light output, the amplification rate of the amplifier provided in the photodetector is increased by three times by the amplification rate regulator 27.

Like the above, by performing optimizations of the intensity of the light irradiated to the cantilever 6 and the amplification rate by the light intensity regulator 28 and the amplification rate regulator 27, it is possible to ensure the detection sensitivity and the ratio of the noise, which are suitable, without depending on differences in the shape, the reflectivity and the mechanical characteristics, such as the spring constant, of the cantilever to be used. Further, the influence of the thermal deformation by the difference in the linear expansion coefficient between the base material and the coated thin film can be made small, so that it becomes possible to perform the measurement in the scanning probe microscope under the optimum conditions.

Embodiment 2

Figure 3:
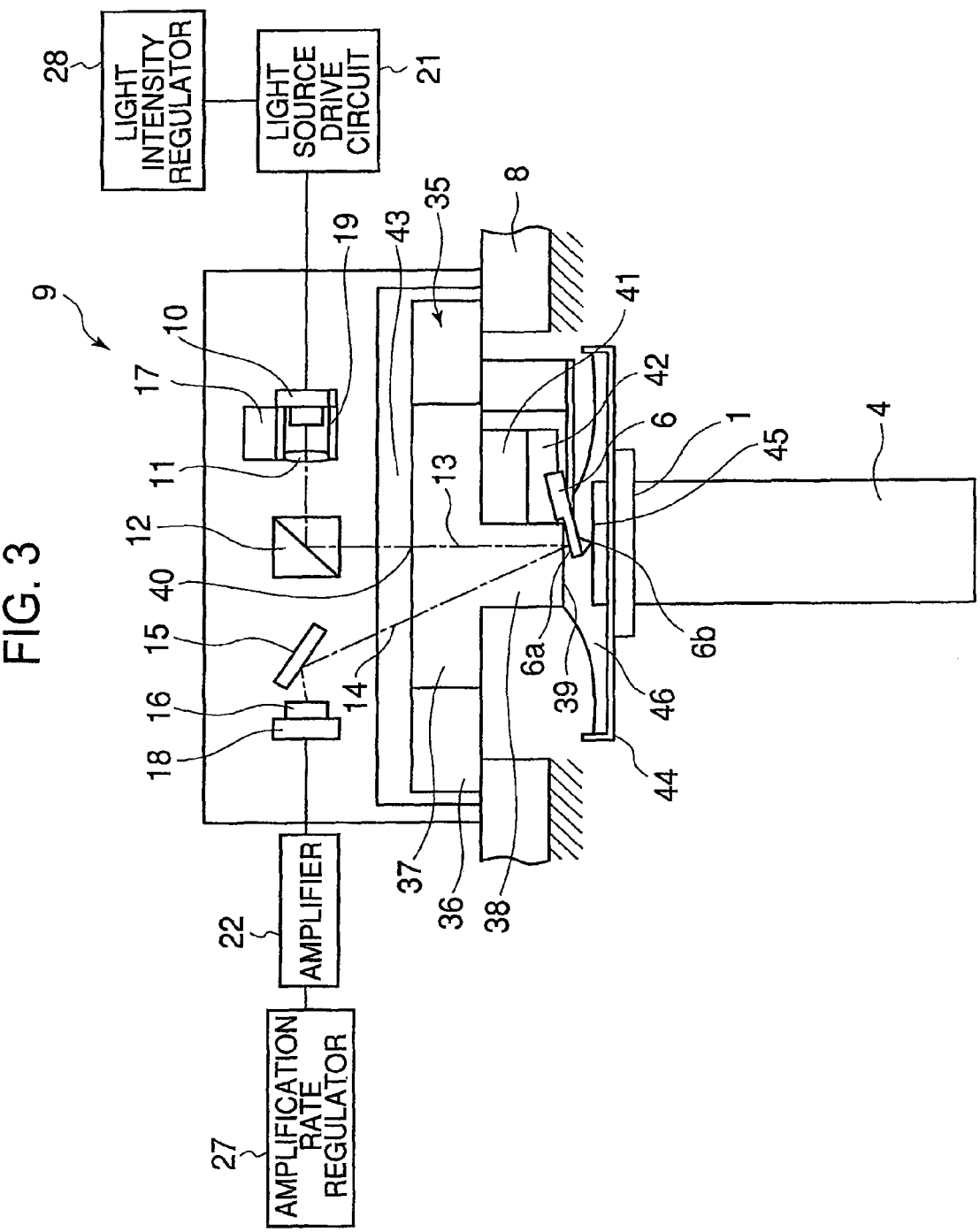
FIG. 3 is a schematic view showing a second embodiment of an optical displacement detection mechanism for a scanning probe microscope used in a solution, which is concerned with the present invention.

A second embodiment concerned with the present invention is explained by FIG. 3. FIG. 3 is a conspectus view of the scanning probe microscope operated in a solution. Since the basic constitution is the same as the first embodiment, explanations of the overlapping portions are omitted.

In the present embodiment, the atomic force microscope of the vibration system is used, and there is made a constitution in which a cantilever holder 35 for a solution measurement of the present embodiment is exchangeable with the cantilever holder 7 used at the measurement time in the air of the embodiment 1.

The cantilever holder 35 for the solution measurement is made a structure comprising a metal base block 36 and a glass base block 37. In the glass base block 37, a vibrator 41 comprising a piezoelectric element for a cantilever vibration and a cantilever fixation part 42 are bond-fixed to the glass base block 37. The cantilever 6 is fixed to the cantilever fixation part 42. Since the vibrator 41 is used in the solution, its periphery is waterproofness-treated by a silicon seal agent, thereby preventing an electric short circuit.

In the glass base block 37, there is provided a protrusion part 38 whose tip is worked to a plane. On the other hand, a Schale 44 is mounted to the sample holder 1 of the three-axis minute movement mechanism 4 constituted by a cylindrical piezoelectric element and, in the Schale 44, there is fixed a sample 45 of a living organism, such as cell, and an organic thin film, which are immersed in a solution 46.

If the sample 45 and the probe 6b are approached, a plane part 39 of the protrusion part 38 contacts with a liquid face in the Schale by a surface tension, and thus the liquid layer 46 is formed, so that there becomes a state in which the cantilever 6 and the sample 45 are immersed in the solution.

In the optical displacement detection mechanism 9, as the light source 10, there is used a super luminescence diode (SLD) whose peak wavelength is 830 nm, and whose spectrum width of the light intensity in regard to the wavelength is 17 nm. The light from the SLD is condensed by the condensing lens 11, and irradiated from just above (Z direction) to the back face of the cantilever 6 that is the measurement object with the optical path of the incident light 13 being bent by the beam splitter 12. The intensity of the light of the light source 10 is set by the light source drive circuit 21. The glass base block 35 of the cantilever holder 35 is made of a quartz glass, and transmits 830 nm that is the wavelength of the SLD. The incident light transmits through the glass base block 37 after being bent in an air layer by the beam splitter 12, proceeds to the liquid layer 46, and is irradiated to the back face of the cantilever 6. The laser light reflected by the back face of the cantilever 6 enters to the photodetector 16, whose light reception face is divided into four, via the mirror 15 after transmitting through the glass base block 37 from the liquid layer 46. The photodetector 16 is connected to the amplifier 22. The amplifier 22 is the same as the circuit shown in FIG. 2 of the first embodiment, and constituted by the electric current/voltage conversion circuit 30 and the differential amplification circuit 33. Here, in a case where the cantilever 6 is vibrated in the solution, such a case is frequent that a noise other than a resonance frequency of the cantilever 6 is added to a detection signal of an amplitude to thereby deteriorate the measurement accuracy by a viscosity resistance that the cantilever 6 undergoes, which is mentioned later, an influence of a scattered light from a member through which the light transmits, additionally fluctuations of the liquid layer 46 and the glass base block 37 following upon the fact that the cantilever 6 is vibrated, and the like. With the purpose of removing this noise, there is also a case where a band-pass filter removing a frequency component other than a vicinity of the resonance frequency of the cantilever 6 is provided in a back side of the differential amplification circuit 33.

Here, since the incident light 13 reflects respectively in an interface 40 between the glass base block 37 and an air layer 43, and an interface 39 between the glass base block 37 and the liquid layer 46, the returned light to the light source 10 side becomes larger than the case where the measurement is performed in the air in the first embodiment. In the case where the semiconductor laser is used in the light source 10 like the embodiment 1, since the returned light noise and the mode hop noise generate by this returned light, it is impossible to increase the output of the light source, and therefor it is impossible to decrease the noise of the photodetector in regard to the detection sensitivity. Like the present embodiment, by using the SLD that is the light source in which a half value width of the spectrum is large and which is low coherent, it is possible to suppress the returned light noise and the mode hop noise, thereby increasing the output of the light source 10.

Like the present embodiment, when the light transmits through the glass base block 37 and the liquid layer 46, a loss of the light occurs. When the light enters onto the cantilever 6 with the same output as the measurement in the air, the intensity of the incident light to the photodetector 16 is lowered, thereby bringing about a decrease in the detection sensitivity and an increase in the noise. In the present embodiment, by raising the intensity of the light source 10 to 4 mW with the light intensity regulator 28 to thereby supplement the loss of the light, the decrease in the detection sensitivity and the increase in the noise are suppressed by ensuring the same incident light intensity as in the air.

In a case where the measurement is performed in the air by exchanging the cantilever holder 35 for the solution with the cantilever holder 7 in the air, since the loss of the light in the glass base block 37 and the liquid layer 46 becomes null, there is used with the light intensity of the light source being returned to 1.5 mW by lowering the value of the electric current driving the SLD 10 by the light intensity regulator 28.

Incidentally, there may be made so as to assemble an optical system in such a manner that a high frequency modulation is performed by using the semiconductor laser instead of the low coherent light source, or the returned light is decreased by utilizing a polarized light. In this case, it becomes possible to slightly raise a limit of the output of the light source, in which the mode hop noise and the returned light noise generate.

Embodiment 3

Figure 4:
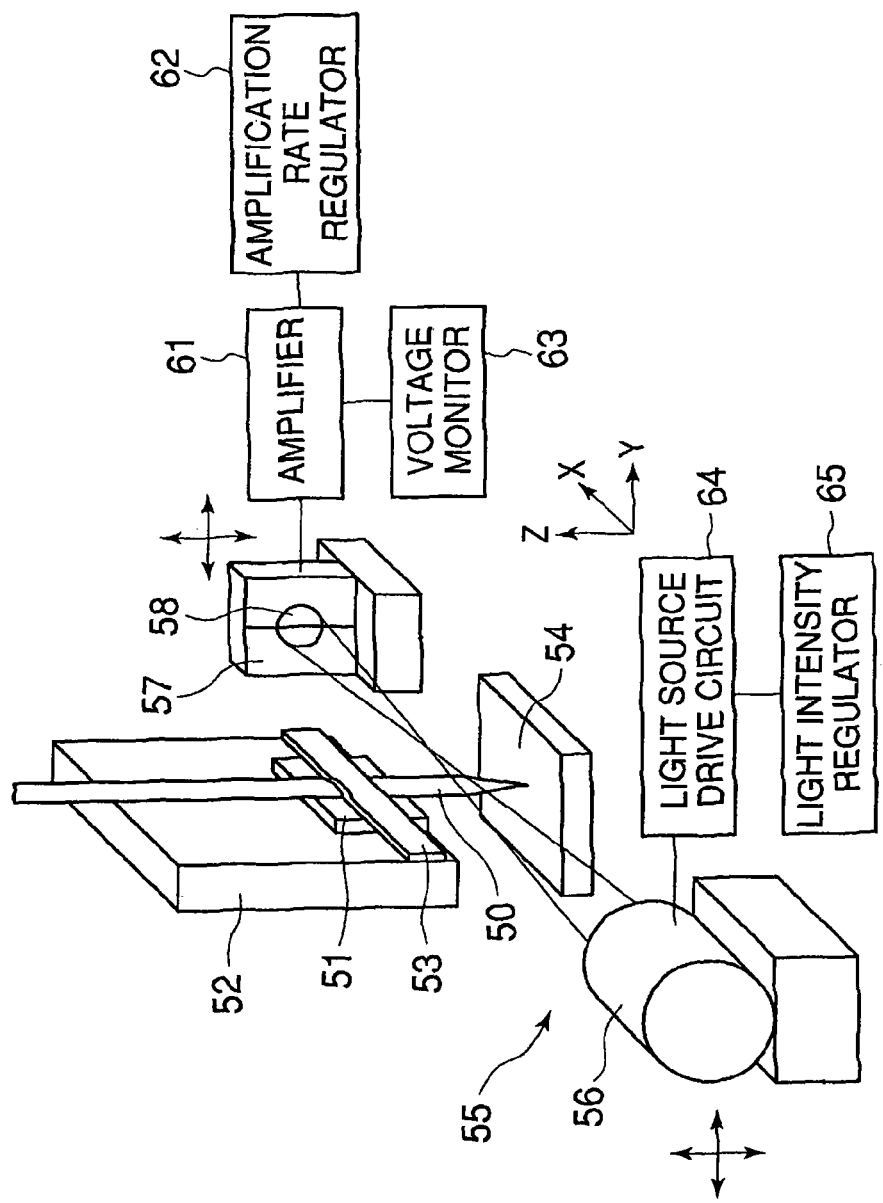
FIG. 4 is a schematic view showing a third embodiment of an optical displacement detection mechanism for a scanning near field microscope, which is concerned with the present invention.

A third embodiment of the present invention is shown in FIG. 4. FIG. 4 is a conspectus view of a probe of the scanning near field microscope that is one kind of the scanning probe microscope probe, and the optical displacement detection mechanism for a displacement detection of the probe. Incidentally, a detailed constitution other than a main part is omitted.

A probe 50 used in the present embodiment is a constitution in which a tip of an optical fiber is sharpened, an opening is provided in a tip part, and a portion other than the opening is coated by aluminum. This probe 50 is fixed by a leaf spring 53 to a probe holder 52 to which a piezoelectric element 51 for vibration is attached, and disposed such that a longitudinal axis direction of the probe 50 intersects perpendicularly to a surface of a sample 54.

The probe 50 disposed like this is vibrated, by the piezoelectric element 51 for vibration, in the vicinity of the resonance frequency of the probe 50 in a direction (Y axis direction in the drawing) parallel to the surface of the sample 54. At this time, if a tip of the probe 50 and the surface of the sample 54 are approached, the probe tip undergoes a force such as resistance force of an adsorption layer, friction force or interatomic force etc. in the surface of the sample 54. These forces are generally called sheer forces. If it undergoes the sheer force, an amplitude of the probe 50 decreases. A decrease quantity of this amplitude depends on a distance between the tip of the probe 50 and the surface of the sample 54. Accordingly, by controlling the distance between the sample 54 and the probe 50 such that the amplitude and a phase become constant while measuring changes in an amplitude quantity and the phase of the probe 50, the sample 54 and the probe 50 can be kept in a constant distance. Similarly to the embodiment 1, under this state, by relatively raster-scanning the sample 54 and the probe 50, it is possible to measure the irregularities image of the sample surface. In the scanning near field microscope, it is possible to simultaneously measure also the optical characteristics of the surface of the sample 54 by entering the light to the probe 50 to thereby generate an evanescent light in the vicinity of an opening part of the probe tip, irradiating it to the sample 54 to thereby be scattered by the sample surface, and detecting that scattered light by the detector.

Here, there is explained a method of measuring the amplitude quantity of the probe 50 in the present embodiment. An optical displacement measurement mechanism 55 of the present embodiment is constituted by a light source part 56 in which there are incorporated a condensing lens and a light emitting diode (LED), and a photodetector 57 whose surface is bisected and whose material is made a semiconductor. The light from the light source part 56 is irradiated to the probe 50 from a just lateral direction (X direction in the drawing). At this time, although the light from the light source part 56 is image-formed, it is irradiated in a position in which an irradiation point to the probe 50 deviates from an image formation point in such a degree that all the light is not shaded by the probe 50. As the LED, there is used one of 700 nm in wavelength and 35 nm in half value width of the spectrum. Although the LED cannot converge a spot small like the semiconductor laser and the SLD, since the optical fiber probe used in the present embodiment is φ 125 μm in diameter and thick in comparison with the cantilever, it is possible to sufficiently perform the measurement even with a size of the spot of the LED.

The light irradiated to the probe 50 once image-forms and thereafter spreads again, and enters so as to produce a limited spot 58 in a face of the photodetector 57 disposed in a position facing on the light source part 56 in regard to the probe 50.

At this time, in the spot 58, a portion shaded by the probe 50 appears while becoming a shadow.

In the optical displacement detection mechanism 55 constituted like this, if the probe 50 vibrates, since there changes a difference in area between portions not shaded by the shadow on the light reception faces of the photodetector 57, which are bisected, it becomes possible to measure the amplitude quantity or the phase of the probe 50 by detecting a difference in the light output between the two divided faces.

Further, there is made such that, by providing an amplification rate regulator 62 in an amplifier 61, it is possible to adjust the amplification rate as well. The amplifier 61 is also coupled to a voltage monitor 63 which monitors a voltage provided to the amplifier 61.

Further, there is made such that, by providing an amplification rate regulator 62 in an amplifier 61, it is possible to adjust the amplification rate as well.

As the probe used in the scanning near field microscope, although there is generally used one whose diameter is 125 μm, in dependence on the sample 54, there is also the fact that there is used one in which the diameter of the probe is small, or there is used a glass pipette whose diameter is large.

Further, as the probe 50, there is also used one in which a metal wire is sharpened and, in this case, a measurement of the optical characteristics of the sample face is performed by generating an evanescent field in the surface of the sample 54, and scattering the evanescent field by the tip of the probe comprising the metal wire, thereby analyzing the scattered light. If the diameter of the probe 50 changes like this, a size of the shadow on the light reception face of the photodetector 57 changes as well and, as a result, the detection sensitivity changes. Thereupon, there is made such that, by changing the electric current value by the light intensity regulator 65 to thereby change a light emitting intensity of the LED, a difference in the detection sensitivity is supplemented. Incidentally, the supplementation may be performed in the amplification rate regulator 62 side.

Like the above, by performing optimizations of the irradiated light intensity to the probe 50 and the amplification rate by the light intensity regulator 65 and the amplification rate regulator 62, an influence of a difference in the shape of the probe to be used can be made small, and it becomes possible to perform the measurement of the scanning near field microscope while ensuring a suitable detection sensitivity.

Embodiment 4

Figure 5:
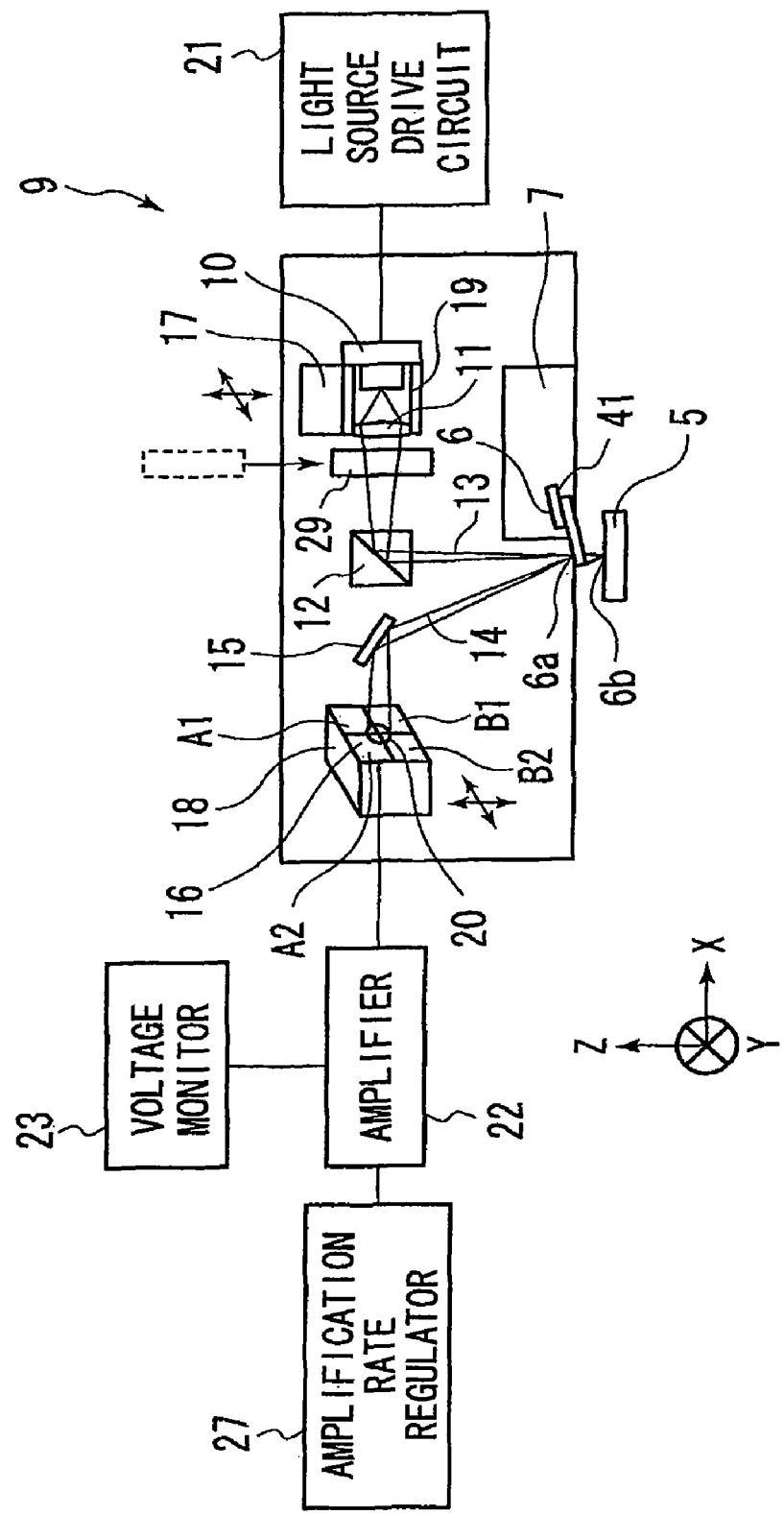
FIG. 5 is a schematic view showing a fourth embodiment of an optical displacement detection mechanism for a scanning probe microscope, which is concerned with the present invention.
Figure 6:
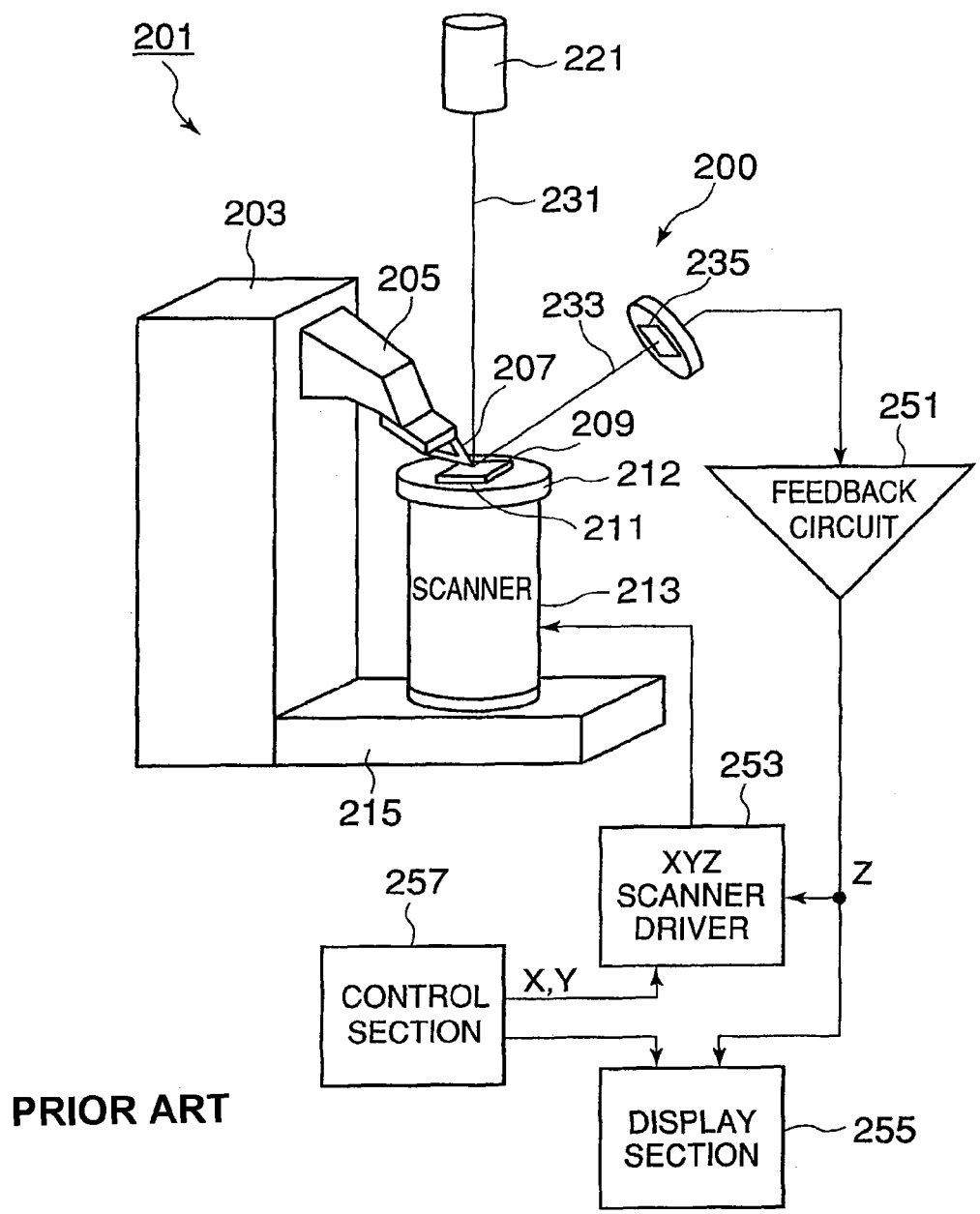
FIG. 6 is a schematic view of a conventional scanning probe microscope.
Figure 7A:
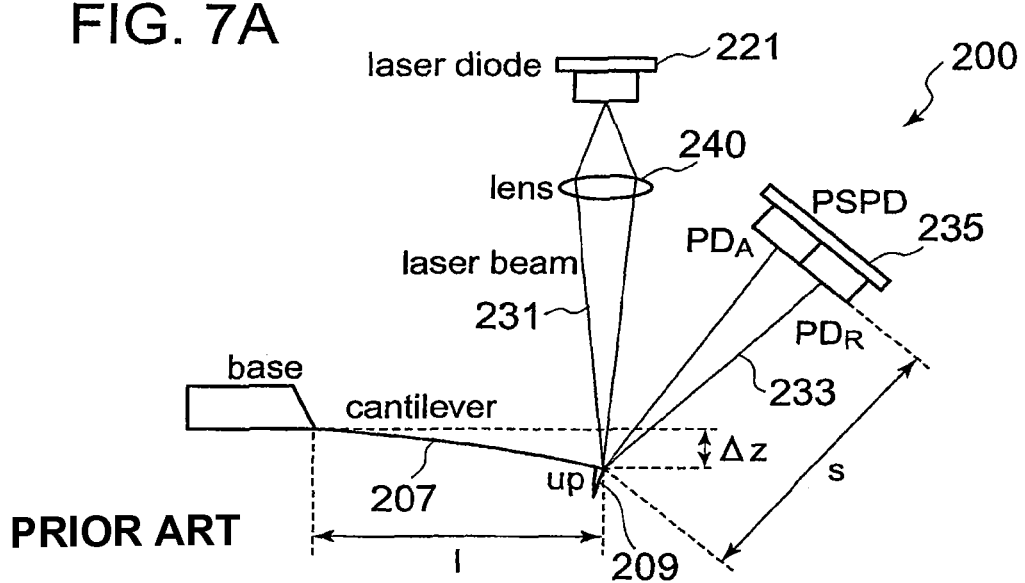
FIG. 7A and FIG. 7B are schematic views of an optical displacement detection mechanism for the conventional scanning probe microscope.
Figure 7B:
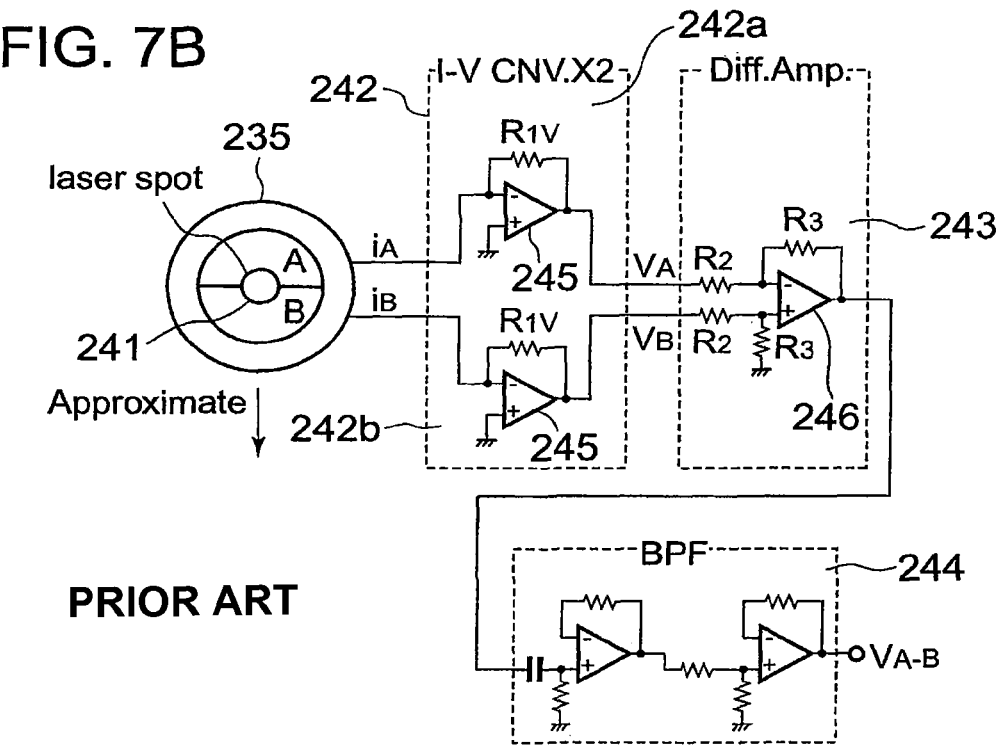

FIG. 5 is a conspectus view of an optical displacement detection mechanism used in a scanning probe microscope of a fourth embodiment of the present invention. In the present embodiment, since the basic constitution is the same one as the optical displacement detection mechanism of the optical lever system, which is explained in the first embodiment by using FIG. 1 and FIG. 2, explanations of the overlapping portions are omitted. A difference from FIG. 1 exists in a point that the light source drive circuit 21 does not include the light intensity regulator.

In the present embodiment, there is made such that the intensity of the light entering to the cantilever 6 can be adjusted by inserting an optical filter 29 adjusting the intensity of the light to the optical path between the light source 10 and the cantilever 6. As the optical filter 29, there is used a darkening filter (ND filter) decreasing the intensity of the light.

By this, there is obtained the same effect as adjusting the incident light intensity to the cantilever by the light intensity regulator 28 of the embodiment 1.

In the above, although there are mentioned about the embodiments of the present invention, the present invention is not limited to these embodiments.

For example, in the present embodiments, although there is used the photodetector made of the semiconductor, whose light reception face is divided into four or bisected, it is possible to apply an arbitrary detector detecting the intensity and the position of the spot of the light. For example, there are marketed a semiconductor element called a position detection element (Position Sensitive Detector: PSD) having no divided faces and capable of detecting the spot position on the light reception face, and the like.

Further, as the light source, although there is desired the semiconductor laser (LD), the super luminescence diode (SLD) or the light emitting diode (LED), whose output is comparatively stable as well, which is excellent in an responsiveness in a case where the light intensity is variable, in which the spot of the light can be converged small by an optical lens in a case where the measurement object is a micro probe, and which is excellent in a coupling efficiency to an optical fiber in a case where the light propagates by the optical fiber, also other light source such as white light source is included in the present invention. Especially, the SLD has such a characteristic that, even if it is used at a high output, the influences of the mode hop noise and the returned light noise can be made small without using a special device like the LD. Further, in the case of the scanning probe microscope for instance, the light reflected by the cantilever that is the measurement object interferes with the light reflected while overflowing from the cantilever and, thus when measuring a relation (generally called a force curve) of a force applied to the probe in regard to the distance between the probe and the sample, there is a case where a swell generates in the force curve. Further, also in a case where the irregularities image is measured, there is a case where an interference fringe generates. Like this, although there is the fact that the interference exerts an adverse influence on a measurement data, it is possible to prevent also the influence of the interference because the SLD is low coherent and small in its interference possibility. Further, in a case where the influence of the interference appears large by the intensity of the light irradiated to the measurement object, it becomes possible to suppress the influence of the interference by lowering the intensity by a light intensity variable means.

Further, in a case where the force curve and the irregularities image are measured by the scanning probe microscope, there is a case where an influence of a stray light appears in the force curve and the irregularities image by an influence of the stray light other than the light entering to the photodetector while reflecting by the cantilever. Generally, since an influence of the stray light becomes larger the larger is the intensity of the light irradiated to the measurement object, in a case where the influence of the stray light is large, it becomes possible to suppress the influence of the stray light by lowering the intensity by the light intensity variable means.

Further, also the optical system is not limited to the present embodiments, and there can be applied to an arbitrary optical displacement detection mechanism if it is one in which the light is irradiated to the measurement object, the light via the measurement object is received by the photodetector, and the displacement of the measurement object is measured by the signal from the photodetector. For example, the light from the light source may be irradiated to the measurement object by being propagated by the optical fiber.

Also as to the light intensity regulator of the light source or the amplification rate regulator in the photodetector side, it is possible to use one of an arbitrary system and, for example, it may be a system made continuously variable by using a volume knob, or a system performing a setting by a changeover switch by previously determining plural set values.

Further, in order to alter the amplification rate, although the resistance value R3 of the differential amplification circuit of FIG. 2 is altered, the resistance value R2 may be altered, or the resistance value R1 of the electric current/voltage conversion circuit 30 may be altered. Further, it may be altered by an adjustment in an electric circuit in a control circuit after the differential amplification circuit 33, or a setting of a software in a signal processing system.

Further, if the optical filter used in the light intensity adjustment of the light source is one used with the purpose of making the light quantity variable, an arbitrary filter can be used.

Further, the scanning probe microscope is not limited to the atomic force microscope of the contact system or the vibration system and the scanning near field microscope, which are mentioned in the embodiments, and one in which the control of the distance between the probe and the sample surface is performed by using the cantilever and the probe while detecting the displacements and the amplitudes of these and one in which the physical properties of the sample surface are measured by detecting a force and an interaction, which are applied to the probe, are all included in the present invention. Further, one in which there is performed a working to the sample surface by the probe or a manipulation of a matter of the sample surface, and the like are all included in the present invention as well. Further, it is not necessary to scan always by the XY scanner, and one having only a function detecting the interaction in a height direction by using the Z minute movement mechanism is included in the present invention as well. Further, in addition to detecting the deflection quantity of the cantilever by a difference signal between the upper and lower light reception faces by using the left and right light reception faces of the photodetector divided into four, it is also possible to measure a friction force by detecting a torsion quantity of the cantilever from a difference signal between the left and right light reception faces. In this case, the amplification rate is altered in regard to a signal of a light intensity difference between the left and right light reception faces.

Further, in a case where, prior to the measurement, there is performed a position alignment of spot light of the light source with the measurement object, although it is performed by moving the light source usually while observing the spot light and the measurement object by an optical microscope, with the light intensity at a measurement time, the spot light of an observation image scatters, so that a center position of the spot light cannot be recognized. In the case like this, by adjusting the light intensity by the light intensity regulator of the present invention while decreasing it, a visibility rises as well, and it becomes also possible to certainly position-align the spot light with the measurement object.

Further, in a case where the spot light is position-aligned with a predetermined position on the photodetector, although the position alignment is performed by moving the photodetector usually while seeing a detection signal, if the detection sensitivity is high since the detection signal changes large by a slight movement quantity of the photodetector, the position alignment is difficult. By changing the intensity by the light intensity regulator and the optical filter of the present invention, or lowering the amplification rate by the amplification rate regulator, it is possible to easily perform also the position alignment of the spot light with the photodetector before the measurement.

Further, the optical displacement detection mechanism of the present invention is not one limited to an application to the scanning probe microscope. For example, it can be applied also to a surface information measurement device, such as surface roughness meter and electrochemical microscope, in which there is used the optical displacement detection mechanism, a probe working device for working the sample surface by the probe, and the like. Also in these devices, in dependence on the sample to be measured, since there is used the probe different in its shape, optical characteristics and mechanical characteristics, by applying the optical displacement detection mechanism of the present invention, it becomes possible to adjust the detection sensitivity and the noise to their optimum states without depending on the probe, and the measurement accuracy of the device rises.

What is claimed is:

1. An optical displacement detection mechanism comprising:
   a light source that irradiates a light to a measurement object, wherein the light source is a low coherent super luminescence diode (SLD), or a low coherent light emitting diode,
   a photodetector that receives the light after irradiated to the measurement object from the light source to thereby detect an intensity of the light and generate a detection signal which represents a deflection quantity of the measurement object, an amplifier that amplifies the detection signal of the photodetector at a predetermined amplification rate, and a light intensity controller that controls the light source to adjust the intensity of the light irradiated to the measurement object based on a condition of the measurement object, wherein the condition of the measurement object comprises shape, reflectivity, or mechanical characteristic of the measurement object, and wherein when a detection sensitivity of the optical displacement detection mechanism changes due to the condition of the measurement object, the light intensity controller optimizes the intensity of the light to compensate for the changed detection sensitivity.

2. An optical displacement detection mechanism according to claim 1, wherein the light intensity controller is a light source drive circuit connected to the light source, which adjusts the intensity of the light emitted from the light source.

3. An optical displacement detection mechanism according to claim 1, wherein the light intensity controller is an optical filter adjusting the intensity of the light, which is inserted on an optical path between the light source and the measurement object.

4. An optical displacement detection mechanism according to claim 1, wherein the light intensity controller controls the light source to increase the intensity of the light irradiated to the measurement object when the reflectivity of the measurement object is decreased.

5. An optical displacement detection mechanism according to claim 1, wherein the light intensity controller controls the light source to increase the intensity of the light irradiated to the measurement object to the extent that a deformation quantity of the measurement object fits into a predetermined value.

6. An optical displacement detection mechanism according to claim 1, wherein the amplifier adjusts the predetermined amplification rate to compensate for the adjusted intensity of the light irradiated to the measurement object.

7. A surface information measurement device having an optical displacement detection mechanism according to claim 1, comprising:
a probe that measures surface information of a sample by performing a detection of position information of the probe with the optical displacement detection mechanism wherein the measurement object is the probe.

8. A scanning probe microscope having an optical displacement detection mechanism according to claim 2, wherein the measurement object comprises:
a cantilever having a probe in its tip or a probe of an arbitrary shape;
a sample holder that holds a sample,
a cantilever holder that holds the cantilever or the probe,
a movement mechanism comprising a minute movement mechanism of at least one axis, which relatively moves the cantilever or the probe and the sample holder at least in a Z direction perpendicular to a surface of the sample, and
a movement controller that controls the movement mechanism on the basis of a detection result by the optical displacement detection mechanism, thereby gathering an observation data of the sample.

9. A scanning probe microscope according to claim 8, wherein the light intensity of the light source is made variable by an electric current value of the light source drive circuit.

10. A scanning probe microscope according to claim 9, wherein the photodetector includes a photodiode comprising a semiconductor material, whose light reception face is divided into four or bisected, and
wherein the amplifier comprises an electric current/voltage conversion circuit connected to each light reception face of the photodetector, and a differential amplification circuit connected to the electric current/voltage conversion circuit.

11. An optical displacement detection mechanism comprising:
a light source that irradiates a light to a measurement object, wherein the light source is a low coherent super luminescence diode (SLD), or a low coherent light emitting diode,
a light source drive circuit that drives the light source,
a photodetector that receives the light after irradiated to the measurement object from the light source to thereby detect an intensity of the light and generate a detection signal which represents a detection quantity of the measurement object,
an amplifier that amplifies the detection signal of the photodetector at a predetermined amplification rate, and
an amplification rate adjuster that adjusts the predetermined amplification rate of the amplifier based on a condition of the measurement object, wherein the condition of the measurement object comprises shape, reflectivity, or mechanical characteristic of the measurement object, and
wherein when a detection sensitivity of the optical displacement detection mechanism changes due to the condition of the measurement object, the amplification rate adjuster optimizes the amplification rate of the amplifier to compensate for the changed detection sensitivity.

12. An optical displacement detection mechanism according to claim 11, wherein the amplifier adjusts the predetermined amplification rate to compensate for a difference in reception light intensity in the photodetector, and the difference in reception light intensity depends on a difference in a reflectivity of the measurement object.

13. An optical displacement detection mechanism according to claim 11, wherein the light source drive circuit adjusts the intensity of the light emitted from the light source, and the amplifier adjusts the predetermined amplification rate to compensate for the adjusted intensity of the light irradiated to the measurement object.

14. An optical displacement detection mechanism according to claim 13, wherein the light source drive circuit lowers the intensity of the light emitted from the light source, and the amplifier increases the predetermined amplification rate to compensate for the lowered intensity of the light irradiated to the measurement object.

* * * * *